Dec. 24, 1946.   T. C. BROOKHART ET AL   2,412,962
SLICING MACHINE
Filed Aug. 22, 1942                4 Sheets-Sheet 1

INVENTORS
Theodore C. Brookhart and
David A. Meeker
BY
Maréchal & Noe
ATTORNEYS

Dec. 24, 1946.　　T. C. BROOKHART ET AL　　2,412,962
SLICING MACHINE
Filed Aug. 22, 1942　　4 Sheets-Sheet 2

INVENTORS
Theodore C. Brookhart
BY David A. Meeker
Maréchal & Noe
ATTORNEYS

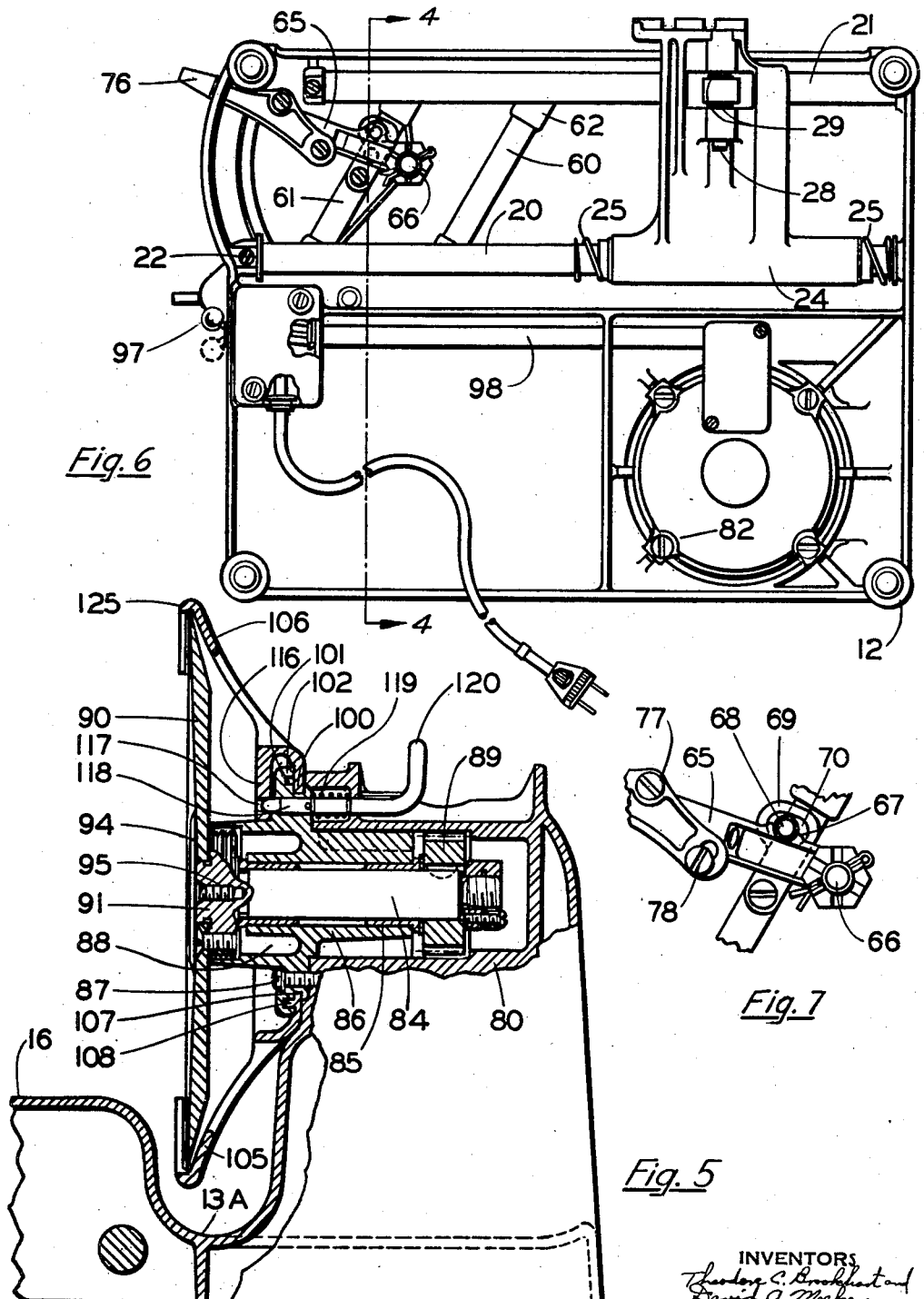

Dec. 24, 1946.    T. C. BROOKHART ET AL    2,412,962
SLICING MACHINE
Filed Aug. 22, 1942    4 Sheets-Sheet 4

INVENTORS
Theodore C. Brookhart
BY David A. Meeker
Marechal & Noe
ATTORNEYS

Patented Dec. 24, 1946

2,412,962

UNITED STATES PATENT OFFICE 2,412,962

SLICING MACHINE

Theodore C. Brookhart and David A. Meeker, Troy, Ohio, assignors to The Hobart Manufacturing Company, Troy, Ohio, a corporation of Ohio Application August 22, 1942, Serial No. 455,808

13 Claims. (Cl. 146—102)

This invention relates to food handling apparatus and more particularly to slicing machines.

It is the principal object of the invention to provide a slicing machine which is compact, light in weight, which is simple and effective in operation, and in which ready access is provided to all exposed parts so that the entire machine can be easily maintained in a clean and sanitary condition.

It is a further object to provide a slicing machine in which the gage plate, knife and the adjacent edge of the carriage at all times overlie the surface of a slice tray which extends from the rear of the knife to the forward face thereof to receive the sliced material and to collect scraps, juices, and the like thereupon, from which such materials can be readily removed.

It is a further object to provide such a slicing machine having a gage plate which is supported from beneath an impervious cover member and which carries a guard overlying its support to prevent passage of material thereonto and to provide for the discharge of scraps and the like downwardly to the receiving surface of the slice tray.

It is a further object to provide in such a slicing machine a knife guard serving as a slice deflector, which fully protects the knife from all sides, and which serves to collect food particles from both sides of the knife and to discharge the same onto the slice tray which extends beneath the knife.

It is a further object to provide a removable knife guard for covering more than half the knife periphery and to form such guard in sections which are adapted to be removed and replaced in predetermined relation to each other to form a complete guard for the exposed edge of the knife.

Other objects and advantages will be apparent from the following description, the accompanying drawing, and the appended claims.

In the drawings:

Fig. 5 is a vertical sectional view through the knife shaft and its support on the line 5—5 of Fig. 3.

Fig. 6 is a plan view looking toward the base of the machine from below;

Fig. 7 is a detail view of the gage plate adjusting mechanism on an enlarged scale;

Figure 2:
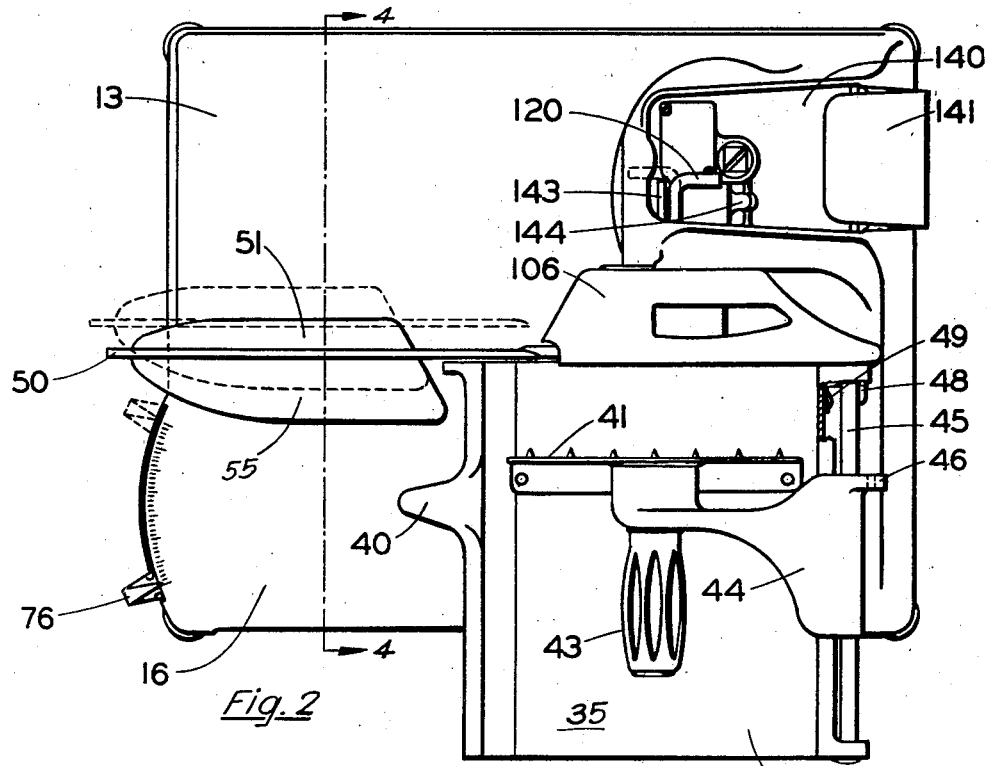
Fig. 2 is a plan view of such machine with the closure over the cavity formed in the housing for the knife supporting means being shown in the open position.
Figure 1:
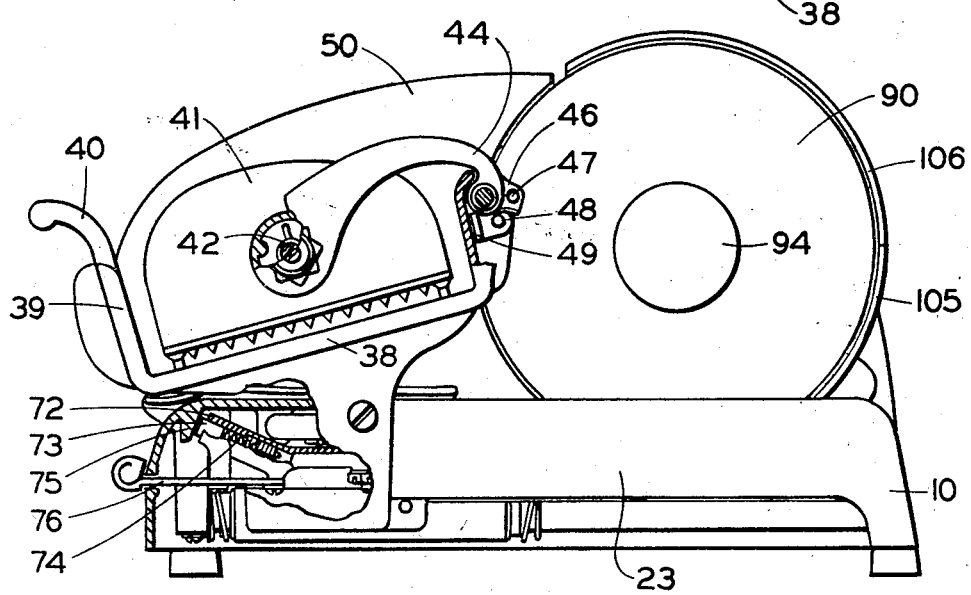
Fig. 1 is a view in elevation of a slicing machine made in accordance with this invention with certain parts being broken away to more clearly show the structure thereof.

Referring to the drawings which disclose a preferred embodiment of the invention, a main base member is shown at 10 which forms the entire lower part of the machine, being preferably formed as a single integral casting, suitably flanged and ribbed as shown at 11 to afford the proper strength with reduced weight. The base member is mounted upon a plurality of feet 12 which are preferably of rubber or other material having high coefficient of friction. At one end, the base member is formed with a low generally flat and somewhat recessed slice tray 13 defined by a raised peripheral edge portion 14, such slice tray extending from the end of the machine into the knife zone.

The base also projects toward the forward side of the knife and has an integral upwardly extending portion 15 and a cover member 16 substantially parallel with and located at a level above that of slice tray 13. It will be noted that the vertical section 15 is joined to these two horizontal sections by means of curved areas 17 each of which is of relatively long radius to avoid the formation of pockets and to make it easy to keep the machine in a clean and sanitary condition by merely wiping across it.

A pair of slide rods 20 and 21 are mounted in the under side of the base member and held in parallel position beneath cover section 16 by bolts 22, the rod 20 being located rearwardly from the rod 21. Cover portion 16 of the base is formed with a depending flange portion 23 which extends downwardly to approximately the level of the adjacent rod 21 to effectively protect the same and to render the entire area beneath the base inaccessible to food particles and other material in the normal use and operation of the machine.

To support the carriage, rear rod 20 carries a guide 24 at either end of which is mounted a resilient member 25 to cushion the shock of the carriage as it nears the end of its reciprocating stroke, and a universal joint connection is provided between the guide 24 and a sleeve 26 which is received over the forward rod 21. This connection comprises an aperture formed in guide 24 through which the end of the sleeve 26 projects, the sleeve carrying an annular flexible collar 27 of rubber or like material, the opening therein extending longitudinally of guide 24. Bolt 28 is carried in a projecting part of guide 24 and extends through the collar 27; washers 29 are located on opposite sides of and engage against the collar. The bolt also has a threaded portion 30 which extends through the forward end of guide 24. Guide 24 is also formed with an integral upright section 31, such section being apertured as shown at 32 to provide for the drawing up of bolt 28 to thereby compress washer 29 against rubber cushion 27 to cause it to be held under yielding pressure in sleeve 26. With this construction there is no loose play between the guide 24 and sleeve 26, but in the event of any misalignment of the rods, relative movement between the two guides is permitted as necessary to avoid binding upon the rods.

The carriage for supporting the work material is shown at 35, and is provided with a downwardly projecting tongue portion 36 which is bolted by means of bolts 37 to the upright 31. If desired the carriage may be removed from upright 31 to provide for handling the work material upon the cover 16, but for most purposes it is preferred to utilize the carriage in the position shown.

The carriage has an upwardly sloping work supporting surface 38 and a right angularly extending abutment face 39. A projecting thumb rest 40 extending from the face 39 provides a convenient support for the hand when manual feed of the work material is desired. Pusher plate 41 is rotatably mounted upon shaft 42 which carries an extended part on which is mounted a hand grip 43, the shaft being journaled in a pusher plate arm 44. Arm 44 is supported from the forward side of the carriage on cross shaft 45 and is mounted thereon for both swinging and sliding movement with respect thereto.

In order to latch the pusher plate in upper inoperative position, to permit of manual feed where desired, the pusher plate arm carries a projecting lug 46 which is apertured at 47 to receive a pin 48 fixedly mounted in the carriage. A resilient spring member 49 mounted on the carriage abuts against the inner face of lug 46 in the raised position of the pusher plate when it has been moved toward the knife to engage aperture 47 over pin 48. This provides for yieldably holding the pusher plate in elevated inoperative position, preventing any loose play between aperture 47 and pin 48 and avoiding the possibility of the dropping thereof upon the hand of the operator. It will be understood that such an operative position is also the limiting position of the forward sliding movement of the pusher plate, and that when so held it clears the knife and knife guard in its reciprocating movement.

The gage plate is shown at 50, being mounted upon a gage plate carrier 51 by means of a plurality of bolts 52 which pass through elongated slots in the carrier 51 to thereby provide for adjusting movement of the gage plate toward and away from the knife, to maintain the desired relationship between the gage plate and the knife as the knife wears.

Figure 4:
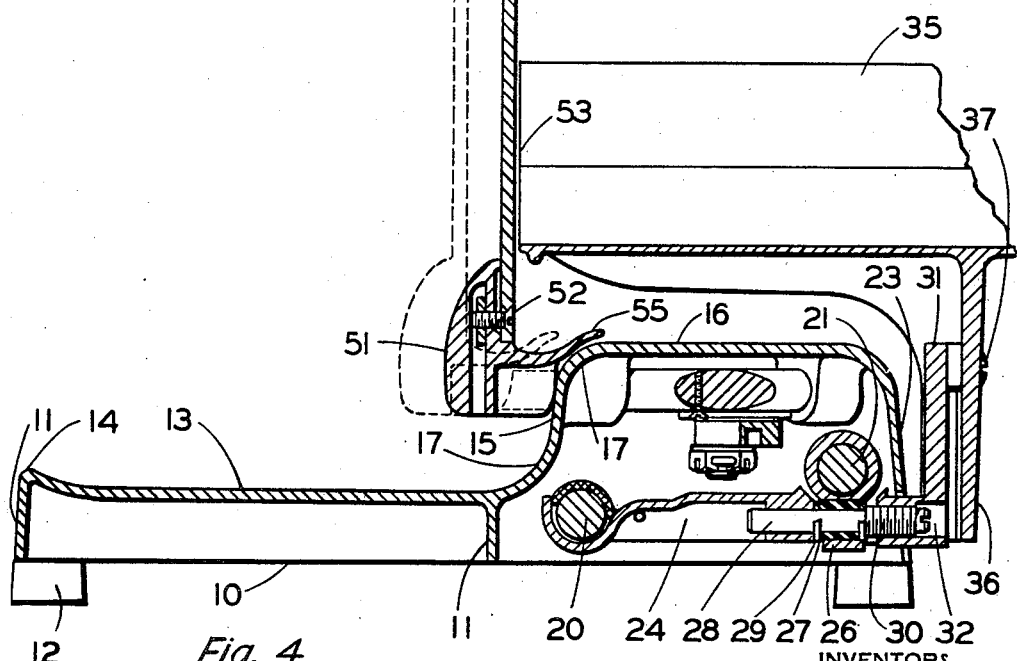
Fig. 4 is a vertical sectional view on the line 4—4 of Fig. 2, the same section line being also shown on Fig. 6.

As shown in Figs. 2 and 4, the gage plate in the closed or full line position is substantially in the same plane as that of the knife and the adjacent edge 53 of the carriage. It will be observed that in this position the parts are located above and directly overlie the lower or slice tray portion 13 of the base. Thus any particles, scraps, or juices and the like which fall from the carriage or from the knife and gage plate during operation, will drop downwardly upon the slice tray 13 from which they can be readily removed. The dotted line showing of Fig. 4 illustrates the position where it is set for maximum cut, and it is obvious that in this position a similar relationship is present.

The gage plate carrier 51 is provided with an integral guard member 55 which is preferably formed in the shape of a grooved trough and located at the lower edge of the gage plate, beneath the carriage, such guard extending in overlying relation to the cover 16. As so formed it likewise overlies the actual gage plate supporting means, to be hereinafter described, and thus prevents access of the food particles thereonto. It is of sufficient width, as shown, to afford such protection even in the fully opened position of the gage plate, as illustrated in dotted lines. Preferably the groove in the guard slopes downwardly toward the knife and terminates in the lip 56 from which the collected particles are thus dropped directly upon the slice tray surface, thereby making for ease and simplicity of cleaning.

The gage plate support is carried by a pair of guide rods 60 and 61 which are slidably carried by bosses 62 formed in the main frame member, on the under side of cover 16. These bosses are located at a desired angle as shown to effect withdrawing movement of the gage plate away from the knife simultaneously with the enlargement of the opening thereof. As above noted, the guard 55 completely overlies the ends of rods 60 which project through the cover, and affords protection against access of food particles thereonto.

Adjustment of the gage plate is effected by means of a lever 65 pivotally mounted for rotation about the axis of shaft 66, the lever being provided with an extension 67 at one side thereof carrying an upwardly extending pin 68. Bolted to shaft 61 is a plate 69 having an elongated slot 70 therein of a width corresponding to that of pin 68, but of greater length to provide for movement of the pin therein. In order to hold the lever in any predetermined position, it is formed with an upwardly inclined portion 72 which has an axial bore into which extends a friction plunger 73, yieldably urged by means of spring 74 against arcuate friction surface 75 formed integrally with the base. Hand lever 76 is fastened to lever 65, extending through a slot formed in the end flange of the base member, by means of bolts 77 and 78, the latter having clearance so as to permit of adjusting the hand lever in desired relation with respect to lever 65, to thereby adjust the zero setting of the gage plate. In the normal operation of the hand lever 76 it is fixedly secured to and operates as an integral part of the lever 65, such swinging movement about center 66 causing a corresponding actuation of the slide rods 61 through the action of pin 68 travelling in the slot 70. Suitable indexing means may be provided for cooperation with the external part of lever 76 to indicate the setting of the gage plate.

Figure 3:
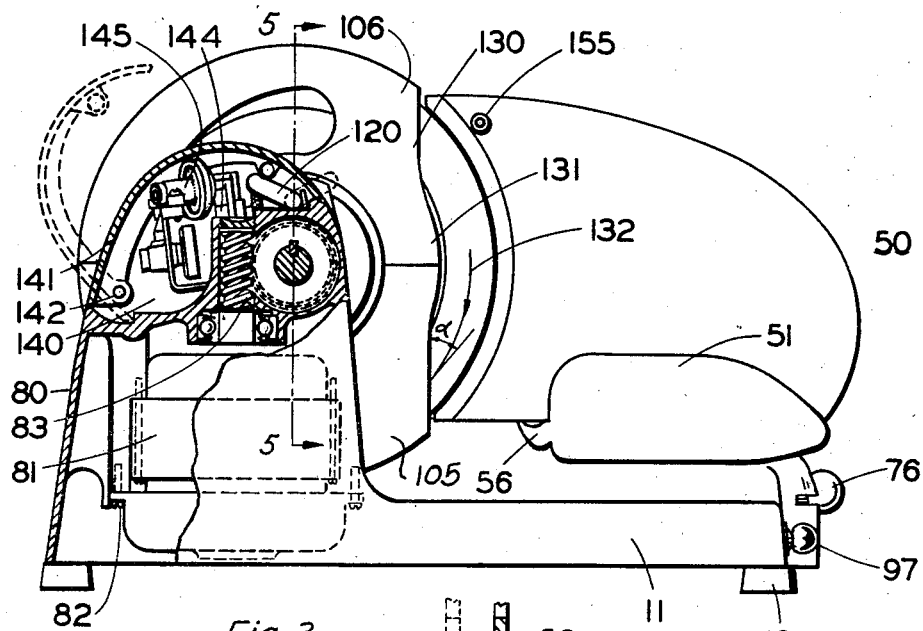
Fig. 3 is a rear elevational view with parts being shown in section through the cavity to show the location of the grinder unit as contained within such cavity.

At its rear portion, the base member is also formed with an integral upstanding projecting part 80 which serves as a housing for the drive motor and knife shaft. The housing 80 is recessed upwardly as shown in Fig. 3, the drive motor 81 being received therein through the open aperture in the base, and removably held by means of bolts 82. Its shaft carries a vertically extending worm 83.

It will be noted that the housing portion 80 terminates to the rear of the knife sufficiently to provide a space for receiving any material dropping downwardly from the knife, the surface 13 of the slice tray being extended into the zone beneath the knife as shown at 13a and being of generally arcuate shape in the plane of the knife to thereby further facilitate the ready cleaning of that space when desired.

The knife shaft is shown at 84, and is rotatably supported in spaced bearings 85, which are received in a housing and supporting member 86. Housing 86 is bolted to the housing portion 80 and supported therefrom by means of bolts 87, and is formed with a forwardly projecting part 88 to receive and retain lubricant for the knife. The knife shaft 84 at its inner overhanging end carries the worm pinion 89 which meshes with the worm 83. The knife is shown at 90, being received over a supporting member 91 which is carried by the knife shaft and received internally of part 88 in sealed relation thereto. The knife is dished in the usual manner and is provided with a center disc 94 which carries a threaded stud 95 to retain the same within the supporting member 91, such disc serving to guide and support the material in its traverse across the face of the knife.

A control switch 97 is located on the base and is connected by suitable wiring 98 with the motor to provide for control of the operation thereof.

A knife guard is provided for protecting the exposed edge of the knife, such exposed edge extending over more than half the periphery of the knife. Likewise it is desired to utilize the guard to deflect slices and scraps from the rear face of the knife and to form a dished cover over the entire rear face of the knife. In order to provide for the ready removal of the guard for purposes of cleaning, it is preferably constructed in a plurality of sections, the sections being separately removable and replaceable in operative position to form when assembled an effective guard for the full extent of the exposed knife edge. Each section thus extends around no more than half the knife periphery and hence may be readily removed and replaced.

For this purpose the outer portion of housing member 86 and the corresponding edge of the housing 80 are formed to provide between them an annular recess 100. Further the member 86 is formed with an inwardly extending recess 101, leaving an overhanging flange portion 102. Such overhanging flange 102 is continuous around the entire periphery of the surface except for a notched out zone 103 of relatively limited extent, located in the upper part of the flange as indicated in Fig. 8.

The knife guard as stated is formed in a plurality of sections, the first section being indicated at 105, and the second section at 106, each section being semi-circular. Section 105 is provided with an annular inwardly extending flange 107 which is adapted to be received within the groove 100. In order to permit of assembly of this housing section in only one position and to prevent removal thereof except in such position, the flange 107 is formed with an inwardly extending lug 108 of less arcuate extent than notch 103 so that it can pass through the notch. Thereafter, upon turning of the guard section about the axis of the knife shaft, lug 108 is locked under flange 102, preventing withdrawal of the guard section away from housing 86.

Figure 8:
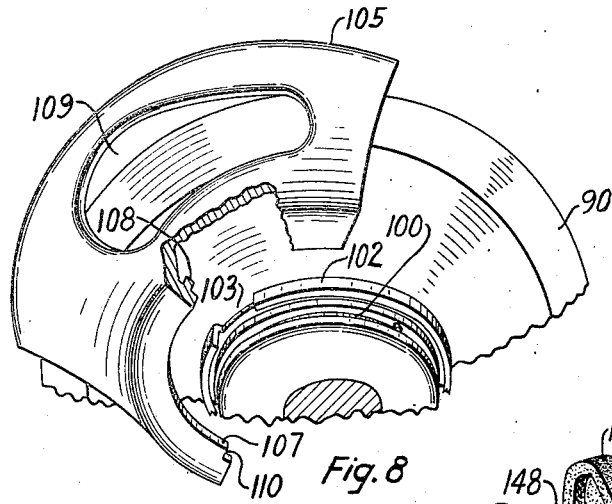
Figs. 8 and 9 are broken perspective views from the rear of the knife showing the structure of the knife guard and the manner in which it is assembled.
Figure 10:
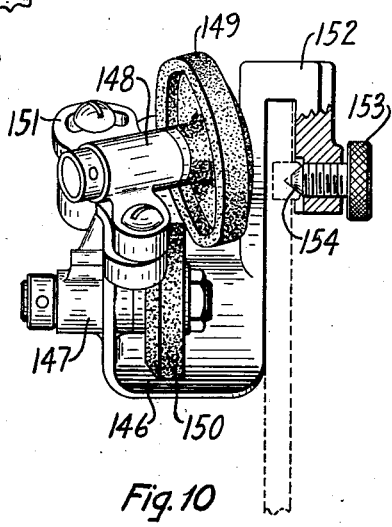
Fig. 10 is an elevational view of the grinder unit.

Thus with the parts in the position shown in Fig. 8, section 105 is being moved into position where lug 108 will be received through notch 103, to be then locked under the flange 102, to thereby secure the section in position upon the housing, permitting free arcuate travel thereof with flange 107 moving around through the groove 100. A cut-out aperture 109 is provided to serve as a grip for handling the guard section, and since it is located to extend radially inwardly of the knife periphery, it provides a space through which a cleaning rag or the like can be applied to the rear face of the knife to remove food particles therefrom without removing the guard.

Figure 9:
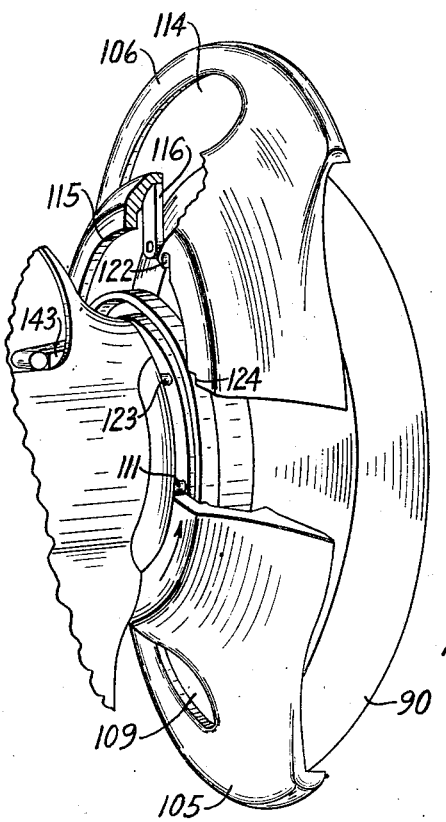

Having been assembled upon the housing, the first guard section 105 is then moved downwardly, in the arcuate direction shown by the arrow in Fig. 9, to its final position where notch 110 is received over a fixed pin 111, suitably carried by the housing 86 in position to project into the groove 100. In such position the guard serves to protect generally the lower exposed portion of the knife and extends upward to about the level of the knife axis at either side thereof.

Thereafter the second guard section 106 is moved into position, such section likewise having a hand aperture 114 and being formed with an annular flange 115 which is adapted to be received within the groove 100. No provision corresponding to lug 108 is made, however, inasmuch as a locking means is provided for the second housing section to lock and retain the assembled guard sections in final operative position. Such locking means comprises a tongue 116 projecting downwardly from the rear portion of the guard, and having a cone-shaped aperture 117 formed therein. A locking pin 118 is suitably mounted in the housing sections 80 and 86, and is provided with a cone-shaped end portion adapted to be received in the seat 117. A spring 119 normally urges the locking pin into seating engagement, and a manually operable portion 120 is formed on the pin to provide for withdrawal thereof.

The flange 115 is likewise notched as indicated at 122 to be received over a fixed pin 123 held in housing 86 for further holding and guiding the second section, and the end of flange 115 is notched as shown at 124 to be received over pin 111, permitting the adjacent edges of the two guard sections to fit closely together.

Having thus first assembled the guard section 105 and turned it around to its operative position as shown in Fig. 9, the second section 106 is slipped into place, and upon withdrawing manual locking pin 120 and allowing it to return and engage in seat 117, it applies continuous pressure to the second guard section, in such a direction as to tend to press it downwardly into contact with the first guard section 105, thereby maintaining such assembled guard sections against undesired movement or rattling in use.

It will be readily understood that when it is desired to remove the guard, manual retaining pin 120 is withdrawn, permitting direct upward withdrawal of the second section 106, after which the first section 105 is moved in an arcuate manner to the position where lug 108 can be withdrawn through slot 103.

When in assembled condition it will be seen that the two guard sections thus provided form a generally cup shaped or dished guard extending from the housing section 80, 86 to the surface of the knife around the entire periphery. Preferably each guard section is formed with a radially extending portion 125 which completely overlies the knife edge, and which extends forwardly somewhat beyond the plane thereof to thus serve as a guard for the forward face of the knife. It is further found that with a guard of this construction, any tendency of the knife to discharge food particles by centrifugal force onto the guard results in those particles being collected on the guard surface, and moving thereacross to drop from the lower surface directly into the slice tray portion 13 of the base from which they can be removed as above described.

It will be noted that portion 125 does not extend around the knife periphery in the area of gage plate 50 as no additional protection is required in this area. The guard is however utilized in this area for the purpose of forming a slice and scrap deflector for the rear of the knife, leaving the cutting edge thereof exposed, and deflecting the slices cut by the knife and discharging any scraps or particles remaining on the surface of the knife downwardly onto the slice tray. As shown in Fig. 3, the edge 130 of the combined guard extends across the knife face in a generally vertical direction, being raised somewhat toward the center as shown at 131 to facilitate the deflecting of the slices downwardly onto the slice tray. The direction of travel of the knife is along the arcuate line indicated by arrow 132, and if a tangent be drawn to this arc at the point where it meets the edge of the slice deflector, it will be seen that the included angle α is an acute angle. This provides for the continuous removal of such particles as may collect upon the rear of the knife, since under the action of the travel of the knife they have a resultant movement radially outwardly and finally downwardly onto the slice tray.

The housing 80 has been shown as provided with a cavity 140 in its upper portion thereof, the manually operable end 120 of locking pin 118 extending into such cavity. The cavity is closed by a pivoted closure member 141, pivoted about axis 142, and generally conforming in its outer surface with the smooth contour of the housing 80. A lug 143 is formed integral with the housing providing a projecting surface over which the end 120 of the locking pin may be engaged to retain the same in withdrawn position. Cavity 140 likewise carries a stud 144 upon which a removable grinder unit 145 is received. Such grinder unit comprises a bracket 146 which is also formed as a guard overlying the stones and serving to collect the particles of the stone and knife which are removed during the grinding operation, to keep the same from falling upon the remainder of the machine. It carries enlargements 147 and 148 in which the grinding stone 149 and the burr removing stone 150, are rotatably mounted, respectively. The latter is provided with an extension 151 having an enlarged slot therein to provide for adjustment of the angle of operation thereof as may be required during use. An overhanging part 152 is threaded to receive a knurled nut 153 having a pointed end 154 which is used for the attachment of the grinder in operative position. Such attachment is made on the gage plate 50, the rear surface of such plate being provided with a button 155 having a central seat therein for receiving the end 154 of the bolt 153, the housing 146 being received on the forward face of the gage plate and serving to clamp the unit upon the gage plate.

For operation, the gage plate is adjusted to an intermediate setting providing a spacing from the knife, and the grinder unit then located upon the gage plate and fastened thereto by means of the bolt 153. Thereafter by operating the manual gage plate adjustment member 76, either the grinding stone or the burr removing stone can be brought into operative relation with the knife and the grinding operation thus effected.

Following the grinding operation the entire grinder unit can be removed for cleaning, and for complete washing by immersion if desired, following which it is returned to the stud 144 within the cavity 140. With the closure 141 in closed position the unit is thus kept in a clean and sanitary condition until further use is required.

It will further be seen from the showing of Fig. 3 that the normal position for operation of the release pin 120 requires that the end thereof be turned to project above the surface of the closure 141. Thus removal of the guard is prevented without first raising the closure 141, and turning pin 118 around to the dotted line position of Fig. 3 where end 120 is easily accessible for manual operation. Conversely the guard cannot be partially reassembled with the release pin 120 left in upwardly extending position, unless the closure is also allowed to remain partially open. Thus an indication is afforded for the operator so that in the normal operation he will provide for the complete locking of the knife guard in proper operative position, following which the retaining pin 120 is returned to the full line position shown in Fig. 3, in which position the closure can be moved to fully closed position, thus assuring that the guard has been properly assembled.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A slicing machine of the character described comprising a base, a rotary knife, means for rotatably supporting said knife from said base, a housing over said supporting means, and removable means for guarding more than half the periphery of said knife including sectional guard members neither of which has a greater peripheral extent that half the periphery of the knife, cooperating means on said housing and on said sectional guard members for individually receiving said guard members in predetermined position thereon, and means for retaining said members in said predetermined position and in assembled abutting relation to each other to form a knife guard for the exposed portion of said knife.

2. A slicing machine of the character described comprising a base, a rotary knife, means for rotatably supporting said knife from said base, a housing over said supporting means, and removable guard means for guarding the exposed edge of said knife formed in a plurality of guard sections the peripheral extent of each of said sections not exceeding half the periphery of the knife, cooperating annular ribs and grooves on said guard sections and on said housing providing for receiving said sections thereon, and means for retaining said guard sections in assembled relation thereon forming an effective guard for the entire exposed edge of the knife.

3. A slicing machine of the character described comprising a base, a rotary knife, means for rotatably supporting said knife from said base, a housing over said supporting means, and removable guard means for guarding the exposed edge of said knife formed in a plurality of guard sections including a first guard section, means on said housing for receiving said first guard section in predetermined angular position and providing for arcuate travel thereof about the knife axis to a final operative position, a second guard section, locking means on said second section, and means on said housing for supporting said second guard section in contact with said first section and cooperating with said locking means for retaining said sections in assembled relation under pressure to avoid movement thereof and to form a complete knife guard for the exposed edge of the knife.

4. A slicing machine of the character described comprising a base, a rotary knife, means for rotatably supporting said knife from said base, a housing over said supporting means, and removable guard means for guarding the exposed edge of said knife formed in a plurality of guard sections including a first guard section, means on said housing for receiving said first guard section in predetermined angular position and providing for arcuate travel thereof about the knife axis to a final operative position, a second guard section, locking means on said second section, means on said housing for supporting said second guard section in abutting contact with said first section and cooperating with said locking means for retaining said sections in assembled relation under pressure to avoid movement thereof and to form a complete knife guard for the exposed edge of the knife, and manually operable means for releasing said pressure to provide for individual removal of said sections from said housing.

5. A slicing machine of the character described comprising a base, a rotary knife, means for supporting said knife from said base, a removable knife guard for protecting the exposed edge of said knife, a manually movable locking means for retaining said knife guard in and releasing the same from its operative position, a housing for said knife supporting means having a cavity therein, said locking means extending into said cavity and having a part located therein and adapted to extend above the level of said cavity for manual operation, and a closure for said cavity movable to closed position only when said locking means is in locking position and has been returned to position below the level of said cavity following locking of said guard in operative position.

6. A slicing machine of the character described comprising a base, a rotary knife, means for supporting said knife from said base, a separable knife sharpener unit adapted to be removably supported in an operative position with respect to said knife, a housing enclosing said knife supporting means, said housing having a cavity therein adapted to receive said unit when removed from said operative position, and a closure over said cavity to prevent access of dust and dirt thereto.

7. A slicing machine of the character described comprising a base, a rotary knife, means for supporting said knife from said base, a separable knife sharpener unit adapted to be removably supported in an operative position for sharpening said knife, a housing enclosing said knife supporting means, said housing having a cavity therein adapted to receive said unit upon removal from said operative position, a movable closure over said cavity, a removable knife guard, means for normally retaining said guard in operative position, and a manually operable release for said retaining means located within said cavity and accessible only upon opening movement of said closure.

8. A slicing machine of the character described comprising a base, a rotary knife, means for supporting said knife from said base, a separable knife sharpener unit adapted to be removably supported in an operative position for sharpening said knife, a housing enclosing said knife supporting means, said housing having a cavity therein adapted to receive said unit upon removal from said operative position, a movable closure over said cavity, a removable knife guard, means for normally retaining said guard in operative position, and a manually operable release for said retaining means located within said cavity and accessible only upon opening movement of said closure, said release having an inoperative position within said cavity and being movable to a position extending above said cavity for manual operation, said closure being movable to closed position only when said manually operable means has been returned to inoperative position following the locking of said guard in guarding position.

9. A slicing machine of the character described comprising a base, a rotary knife supported on said base, a slice tray at the rear of said knife, a unitary arcuate knife guard for protecting a portion of the rear face of the knife and the exposed edge thereof, said knife guard having a cup-shaped portion overlying the rear face of said knife and an integral portion adapted to serve as a slice deflector to deflect slices toward said slice tray, said knife guard also having an integral flanged portion closely adjacent the knife periphery and extending in continuous integral relation from the rear of the knife beyond the forward face thereof, means for removably supporting said knife guard from said base for removal therefrom as a unit, and means for locking said knife guard in assembled predetermined position upon said base with said slice deflector portion in proper position to deflect slices toward said tray.

10. A slicing machine of the character described comprising a rotary knife, a main base member supporting said knife, a slice tray at the rear of said knife, an arcuate knife guard for protecting the rear of said knife and the peripheral edge thereof including two separate individually removable sections, said sections together covering and protecting substantially the entire circumference at the rear of said knife and terminating at one side of the knife in a substantially vertical line forming a deflecting surface for discharging sliced material and particles thereof from the rear face of said knife downwardly onto said slice tray, means for mounting said sections at the rear of said knife in cooperating assembled relation and providing for individual removal thereof for cleaning and the like, and means for predetermining the operative position of each of said sections providing for cooperative relation therebetween and proper relative location of said deflecting surface.

11. A slicing machine of the character described comprising a rotary knife, a main base member supporting said knife, a slice tray at the rear of said knife, an arcuate knife guard for protecting the rear of said knife and the peripheral edge thereof including two separate individually removable sections, said sections each covering and protecting approximately half the entire circumference at the rear of said knife and being formed to provide in assembled position a slice deflector surface at one side of said knife, and means for mounting said sections at the rear of said knife in cooperating assembled relation and providing for individual removal thereof for cleaning and the like.

12. A slicing machine of the character described comprising a base, a rotary knife, means for rotatably supporting said knife from said base, a housing over said supporting means at the rear of said knife, removable guard means for guarding the rear face of the exposed edge of said knife and formed in a plurality of cooperating guard sections individually removable and replaceable in predetermined sequence upon the same side of said knife to form a complete guard therefor including a first guard section, means on the housing at the rear of said knife for receiving said first guard section in predetermined angular position and providing for arcuate travel thereof around the knife axis to a final operative position, a second guard section, and means on said housing at the rear of said knife for receiving said second guard section in substantially the same position in which said first guard section was received and retaining said second section in assembled relation with said first section to form a complete knife guard at the rear of said knife and on the exposed edge thereof.

13. A slicing machine of the character described comprising a base, a rotary knife, means for rotatably supporting said knife from said base, a housing over said supporting means at the rear of said knife, removable guard means for guarding the exposed edge of said knife formed in a plurality of cooperating guard sections removable and replaceable on said housing at the same side of said knife in predetermined sequence including a first guard section, means on said housing for receiving said first guard section in predetermined angular position and providing for arcuate travel thereof around the knife axis to a final operative position, means preventing removal of said first guard section from said operative position except in said predetermined angular position, a second guard section, locking means on said second section, and means on said housing for receiving said second guard section in substantially the same angular position as said first guard section and cooperating with said locking means for retaining said second section in assembled relation with said first section to form a complete knife guard for the exposed edge of the knife.

THEODORE C. BROOKHART.
DAVID A. MEEKER.